United States Patent [19]

Buzby, Jr.

[11] 3,894,040
[45] July 8, 1975

[54] 2,5,6,7-TETRAHYDRO-3H-IMIDAZO(1,2-D)(1,4)BENZODIAZEPINE-5,6-DICARBOXYLIC ACID ESTERS

[75] Inventor: George C. Buzby, Jr., Philadelphia, Pa.

[73] Assignee: American Home Products Corporation, New York, N.Y.

[22] Filed: Sept. 16, 1974

[21] Appl. No.: 506,085

[52] U.S. Cl. ............... 260/309.6; 260/470; 424/273
[51] Int. Cl. ............................................. C07d 49/34
[58] Field of Search .................................. 260/309.6

[56] References Cited
OTHER PUBLICATIONS
Chem. Abstracts, 50:361F.

*Primary Examiner*—Ethel G. Love
*Attorney, Agent, or Firm*—Richard K. Jackson

[57] ABSTRACT

Compounds of the formula:

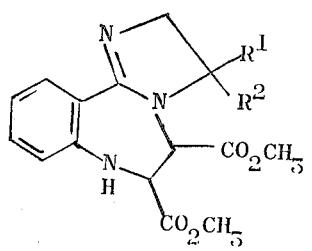

in which $R^1$ and $R^2$ are independently —H, —$CH_3$, —$C_2H_5$ or —$C_3H_7$, are pharmaceutically acceptable acid addition salts thereof, are antiarrhythmic agents useful in the preventive treatment of tachyarrhythmias.

5 Claims, No Drawings

2,5,6,7-TETRAHYDRO-3H-IMIDAZO(1,2-D)(1,4)BENZODIAZEPINE-5,6-DICARBOXYLIC ACID ESTERS

DESCRIPTION OF THE INVENTION

In accordance with this invention there is provided anti-arrhythmic agents of the structural formula:

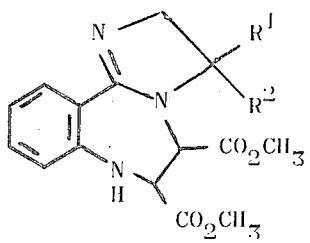

in which $R^1$ and $R^2$ are independently —H, —$CH_3$, —$C_2H_5$ or $C_3H_7$, and pharmaceutically acceptable acid addition salts thereof.

The compounds of this invention are produced by reaction of dimethyl acetylenedicarboxylate and an imidazo aniline of the formula:

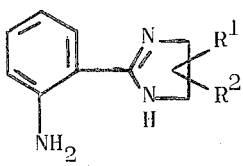

in an inert polar organic solvent. The pharmaceutically acceptable acid addition salts of the products are produced in conventional manner from the free base and include salts formed with organic and inorganic acids such as hydrochloric, hydrobromic, sulfuric, phosphoric, methane sulfonic, acetic, lactic, succinic, maleic, aconitic, phthalic, tartaric, and similar acids. The addition salts are especially valuable in the formulation of soluble dosage forms and they provide a rapidly absorbed dose for obtaining a higher blood level in a shorter time than is possible with the free base.

The imidazo aniline precursor is readily prepared by condensing methyl anthranilate with a benzene sulfonyl chloride such as p-methoxybenzene sulfonyl chloride followed by reaction with 1,2-diaminoethane or a 2-mono- or (gem)dialkyl-1,2-diaminoethane, in which the alkyl substituent contains from 1 to 3 carbon atoms, to obtain the corresponding 2-imidazolin-2-yl-N-(4-methoxybenzene sulfonyl)aniline derivative which is then desulfonylated to afford to 2-imidazol-2-yl aniline precursor. The preparation of the imidazo aniline precursors is exemplified as follows:

Dissolve 15 grams of methylanthranilate in pyridine (15 milliliters) and benzene (100 milliliters) and add a stoichiometric amount of p-methoxybenzenesulfonyl chloride. After standing for four hours the precipitate is removed by filtration, washed with benzene and the filtrate evaporated to dryness. Recrystallization of the residue gave methyl o-(4-aminobenzenesulfonamido)-benzoate (25.0 grams, melting range 81°–85°C.). Reflux the product (5.0 grams) overnight with 1,2-diamino-2-methyl propane (50 milliliters). Remove the excess diamine under vacuum and heat the residue at 170°–190°C. on an oil bath, stripping at 0.5 millimeters Hg vacuum. The solidified contents of the flask is recrystallized from ethanol-benzene to provide 2'[4,4(or 5,5)dimethyl-2-imidazolin-2-yl]-4-methoxy benzene sulfonanilide (5.475 grams, melting range 202°–205°C.) which is desulfonylated by heating on a steam bath overnight with 92 percent $H_2SO_4$ (102 milliliters concentrates $H_2SO_4$ plus 12 milliliters $H_2O$) followed by cooling and pouring the product into ice water containing excess $NH_4OH$. Extract with methylene chloride, dry and remove the solvent to obtain o-[4,4(5,5)dimethyl-imidazolin-2-yl]aniline. The corresponding imidazo aniline precursor devoid of gem-dimethyl groups is made in the same way by employing 1,2-diamino ethane as the reactant. Likewise, benzene sulfonyl chlorides in general may be employed in lieu of the p-methoxybenzene sulfonyl chloride specifically employed herein.

The compounds of this invention are useful as antiarrhythmic agents. They are used to treat conditions in the living organism responsive to antiarrhythmic agents, such as cardiac arrhythmia. By preventing tachyarrhythmias, they are used to maintain natural rhythm of the heart, which may be essential during periods of recovery, especially after diagnosis of prior myocardial injury, hypoxia, respiratory acidosis, hypokalemia, severe hypocalcemia, and similar problems.

The dose must be individualized to obtain the desired blood levels of the compounds of this invention. Administration orally, intravenously or intravenously following a bolus injection, result in different patient response rates requiring careful control for establishment of the optimum rate of administration for maintenance dosing. In general, the dosage lies between about 0.1 to about 30 milligram/kilogram body weight/day.

The antiarrhythmic activity of the claimed compounds was established by measurement of electrical fibrillatory threshold elevation resulting from administration of the compounds to dogs in which ventricular fibrillation was previously induced electrically. Thus the anesthetized dogs heart is exposed by a left thoracotomy. Bipolar electrodes are sutured to the epicardial surface of the left ventricle. The heart is stimulated with square wave pulses of 2–3 milliseconds duration and 60 Herz frequency for 5 second periods. The voltage is increased until fibrillation ensues. The heart is then defibrillated by DC countershock and the procedure repeated at 10 minute intervals. The compounds of this invention are administered intravenously over 3 minute periods and the fibrillation threshold is examined 10 minutes after the start of each injected dose. The elevation in fibrillatory threshold voltage is determined, a 1.25–2 volt increase being considered a moderate threshold increase. The compounds of this invention increased the voltage threshold of fibrillation within the range of 1.25 to 2 volts when administered at from 10 to 20 milligrams per kilogram body weight. No significant effect on systemic blood pressure was detected at doses as high as 75 milligrams per kilogram body weight. No undesirable side effect, such as myocardial contractility or conduction was noted at any dose level below 127 milligrams per kilogram. Thus, the compounds of this invention present an excellent antiarrhythmic response with relatively low order of observable side effects.

The compounds of this invention can be administered alone or in combination with pharmaceutically acceptable carriers proportioned for purposes of solubility, route of administration and standard pharmaceutical practice. Thus, tablets and capsules may be formulated for oral administration containing such common excipients as starch, milk, sugar, clays, and the like. They may be administered sublingually as troches or lozenges in admixture with sugar, corn syrup, flavoring agents or dyes. They may be orally administered as solutions which may contain coloring and flavoring agents. For parenteral administration, whether via intramuscular, intravenous or subcutaneous injection, they may be formulated as a sterile solution containing enough saline or glucose to make the solution isotonic.

EXAMPLE 1

2,5,6,7-Tetrahydro-3,3-dimethyl-3H-imidazo[1,2-d][1,4]benzodiazepine-5,6-dicarboxylic acid, dimethyl ester.

2-(o-Aminophenyl)-4,4(5,5)-dimethyl-2-imidazoline (3.0 grams) in methanol (100 milliliters) containing dimethyl acetylene dicarboxylic ester (2.13 grams) is refluxed for 6.5 hours and stripped to a dark gum. The product is dissolved in benzene, filtered through Florex and converted into its hydrochloride salt, giving 3.00 grams, melting range 227°–229°C. (decomp.). The title compound, as the free base, is produced from the hydrochloride addition salt by partition between aqueous sodium bicarbonate and methylene chloride. The solvents are evaporated, affording the title compound 1.425 grams, melting range 103°–105°C.

Elemental analysis for $C_{17}H_{21}N_3O_4$:
Calculated: C, 61.62; H, 6.39; N, 12.68.
Found: C, 61.44; H, 6.44; N, 12.73.

Nuclear magnetic resonance identified the 3,3-gem dimethyl group as two singlets −1.30, 1.36 ppm; the 5 and 6 methyl esters as two singlets −3.66, 3.75 ppm; one exchangeable proton at 5.80; and a multiplet around 3.10 (doublet of doublets) for H–2, H–2, H–5 and H–6, integrating for four protons.

EXAMPLE 2

2,5,6,7-Tetrahydro-3H-imidazo[1,2-d][1,4]benzodiazepine-5,6-dicarboxylic acid, dimethyl ester 2-(o-aminophenyl)-2-imidazoline (3.0 grams) in methanol (100 milliliters) containing dimethyl acetylene dicarboxylate (3.52 grams) is refluxed for 2.5 hours, the solvent stripped and the dark gum residue crystallized from methanol-isopropanol to afford 4.625 grams, melting range 188°–190°C. (decomp.) of the title compound.

The hydrochloride addition salt is prepared by treating the title compound with isopropanolic HCl, melting range 124°–126°C. (decomp.) as an isopropanol solvate.

Elemental Analysis for $C_{15}H_{18}O_4N_3Cl \cdot C_3H_8O$
Calculated: C, 54.04; H, 6.55; N, 10.50.
Found: C, 53.98; H, 6.40; N, 10.34.

Nuclear magnetic resonance and infra-red spectral data confirm the structure of the entitled compound.

What is claimed is:

1. A compound of the formula:

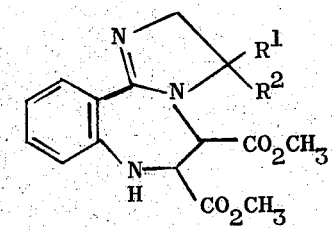

in which $R^1$ and $R^2$ are independently —H, —$CH_3$, —$C_2H_5$ or $C_3H_7$, and pharmaceutically acceptable acid addition salts thereof.

2. The compound of claim 1 which is 2,5,6,7-tetrahydro-3,3-dimethyl-3H-imidazo[1,2-d][1,4]benzodiazepine-5,6-dicarboxylic acid, dimethyl ester.

3. The compound of claim 1 which is 2,5,6,7-tetrahydro-3H-imidazo-[1,2-d][1,4]benzodiazepine-5,6-dicarboxylic acid, dimethyl ester.

4. The compound of claim 1 which is 2,5,6,7-tetrahydro-3,3-dimethyl-3H-imidazo[1,2-d][1,4]benzodiazepine-5,6-dicarboxylic acid, dimethyl ester, hydrochloride.

5. The compound of claim 1 which 2,5,6,7-tetrahydro-3H-imidazo[1,2-d][1,4]benzodiazepine-5,6-dicarboxylic acid, dimethyl ester, hydrochloride.

* * * * *